Feb. 25, 1964 — A. H. MARK ETAL — 3,122,025
TRACTOR TRANSMISSION
Filed March 29, 1961 — 3 Sheets-Sheet 1

INVENTORS.
ALEXANDER HING MARK &
BY WILLIAM G. COLESTOCK

Wolf, Hubbard, Voit & Osann
ATTORNEYS.

INVENTORS.
ALEXANDER HING MARK &
BY WILLIAM G. COLESTOCK

ATTORNEYS.

Feb. 25, 1964

A. H. MARK ETAL
TRACTOR TRANSMISSION 3,122,025

Filed March 29, 1961

INVENTORS.
ALEXANDER HING MARK &
BY WILLIAM G. COLESTOCK

ATTORNEYS.

3,122,025
TRACTOR TRANSMISSION
Alexander Hing Mark, Livonia, and William G. Colestock, Detroit, Mich., assignors to Massey-Ferguson Inc., Detroit, Mich., a corporation of Maryland
Filed Mar. 29, 1961, Ser. No. 99,248
9 Claims. (Cl. 74—11)

This invention relates generally to tractor transmissions and more particularly concerns an infinitely variable transmission suited for use in agricultural and industrial tractors.

The primary aim of the invention is to provide an infinitely variable transmission which affords the desired power characteristics for tractor use and whose components fit easily within the space conventionally allotted to tractor transmissions. Indeed, it is an object of the invention to provide a transmission of this type which requires no repositioning of engine, PTO or output shafts and which utilizes the same transmission case normally employed for a standard, shiftable gear transmission.

It is also an object to provide a transmission of the above character which transmits substantial power with particularly good efficiency in the speed ranges wherein tractors most frequently operate.

Another object is to provide a transmission as described above which is particularly adaptable for economical, efficient use in industrial tractors, agricultural tractors of medium power, and modern high horsepower tractors; despite the different demands each of such tractors make on a transmission.

Other objects and advantages of the invention become apparent upon reading the following detailed description and upon reference to the drawings, in which.

While the invention will be described in connection with certain preferred embodiments, it will be understood that we do not intend to limit the invention to those embodiments. On the contrary, we intend to cover all alternatives, modifications and equivalents as may be included within the spirit and scope of the invention as defined by the appended claims.

Figure 1:
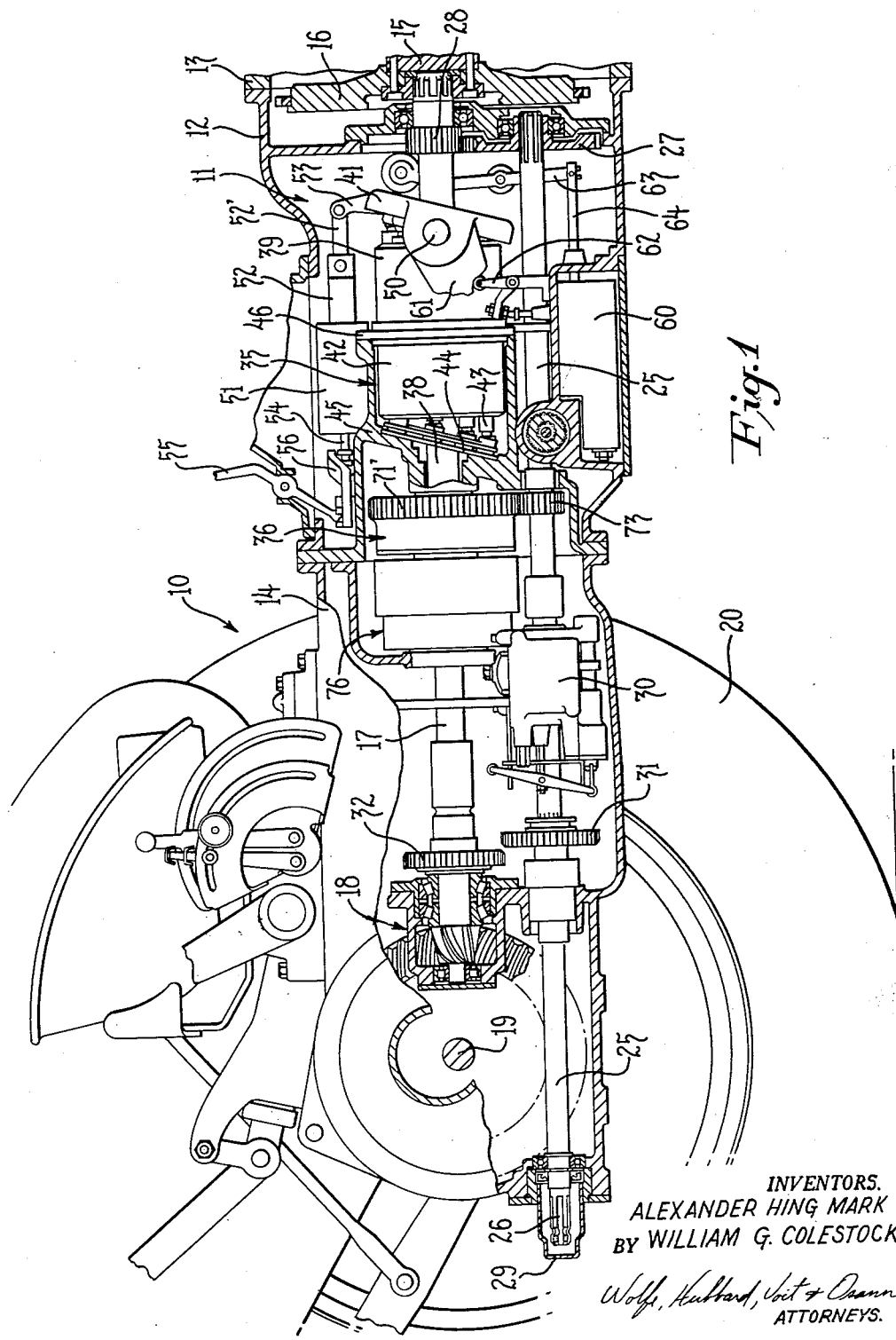
FIGURE 1 is a fragmentary elevation, partially in section, of a tractor embodying a transmission constructed in accordance with the present invention.

Turning now to FIG. 1, there is shown a fragment of a tractor 10 which includes a transmission 11 embodying the invention. The transmission 11 is encased in a housing 12 that is sandwiched between a motor case 13 and a differential housing 14. The transmission controls the application of power from an engine power shaft 15, which carries a usual flywheel 16, to a transmission output shaft 17 that drives differential gearing 18 connected to the rear axles 19 of the tractor, of which only one is shown in the drawings. The tractor 10 includes rear drive wheels 20 which are driven with the axles 19 in the usual manner.

As is common, a power takeoff or PTO shaft 25 is journalled through the transmission housing 12 and the differential housing 14 so as to present a splined power takeoff connection 26 at the rear of the tractor 10. The PTO shaft, at its forward end, carries a gear 27 which is in meshing engagement with a pinion 28 that is directly coupled to the engine flywheel 16. The PTO shaft 25 is thus constantly rotated whenever the engine of the tractor is driven and, thus, the tractor 10 is provided with a "live" PTO at the connection 26. When not in use, the connection 26 is shielded by a removable cover 29.

To provide a source of hydraulic fluid under pressure for the various hydraulically operated mechanisms of the tractor 10, the PTO shaft 25 is directly connected to a pump 30 mounted within the differential housing 14. The PTO shaft 25 also carries a shiftable gear 31 adapted to be moved into meshing engagement with a gear 32 secured to the transmission output shaft 17. The arrangement may take various forms either as shown in Klemm 2,817,408, December 24, 1957, or in Elfes application Serial No. 850,910 filed November 4, 1959, now Patent No. 3,041,884. When the shiftable gear 31 is moved into engagement with the gear 32, the PTO shaft 25 is directly coupled to the differential gearing 18 so that the tractor 10 is driven in synchronism with rotation of the PTO connection 26. This mode of operation is useful when the tractor 10 is utilized with equipment that must operate at a fixed rate relative to its ground speed.

In accordance with the invention, an infinitely variable pump-motor drive unit 35 and the PTO shaft 25 are arranged to drive a combining planetary 36 that is rotatably coupled to the transmission output shaft 17. In the preferred embodiment, the pump-motor drive unit 35 is of the axially disposed, reciprocating piston type which includes axially alined pump and motor shafts 37 and 38, respectively. The pump shaft 37 is splined to a pump housing 39 in which are disposed a plurality of pump pistons 40 that are adapted to be axially reciprocated by a tiltable wobble plate 41. The motor shaft 38 is splined to a motor housing 42 having a plurality of axially shiftable pistons 43 which act against a fixed bearing plate 44 to impart a torque to the motor shaft 38. The bearing plate 44 is carried by a drive unit housing 45 that is anchored in place between the mating edges of the housings 12, 14. The housing 45 supports a valve plate 46 which is interposed between the pump and motor portions of the drive unit and which is provided with the usual passages to control the transmission of fluid.

In order to serve as a control member for the drive unit 35, the wobble plate 41 carries oppositely extending stub shaft portions 50 (see FIG. 1) which are pivoted on the opposite side walls of the transmission housing 12. The tilted position of the wobble plate is controlled by a hydraulic servo 51 having an output plunger 52 connected through a link 52' to an upstanding arm 53 on the wobble plate 41. An input plunger 54 for the servo 51 is moved by a control lever 55 through an intermediate lever 56 that is pivoted on the drive unit housing 45. As will be familiar to those skilled in the art, the output plunger 52 of the servo 51 is hydraulically positioned with considerable force to correspond with changes in the position of the input plunger 54. Thus, the operator of the tractor 10, by manipulating the lever 55, controls the angle at which the wobble plate 41 is disposed and thus controls the speed at which the motor shaft 38 is driven relative to the rotational speed of the pump shaft 37.

In a drive unit of this type, the wobble plate normally has a range of movement of about 50° to 60° and is capable of being moved through a 90° angle with respect to the axis of the pump shaft 37 so as to slow the forward driven speed of the motor shaft 38 to a non-rotating, locked-up condition and then cause the motor shaft 38 to be driven in a reverse direction. Thus, the drive unit 35 permits the driven speed of the motor shaft 38 to be infinitely varied relative to the speed of the pump shaft 37 through a range from fast forward, in which the motor shaft 38 rotates at least as rapidly as the pump shaft 37, to slow reverse, in which the motor shaft 38 is driven slowly in a reverse direction with respect to rotation of the pump shaft 37.

The drive unit 35 also includes a control valve block 60 which regulates the hydraulic pressure between the pump pistons 40 and the motor pistons 43. The wobble plate 41 carries a cam arm 61 (see FIG. 1) which, through a bell crank 62, adjusts the valving in the block 60. In addition, a lever 63, operable from the left hand or opposite side of the transmission case 12 as viewed in the drawings, operates a slide 64 to open a hydraulic by-pass circuit in the valve block 60 which, in effect, relieves fluid pressure in the drive unit 35 so as to establish a free-wheeling, neutral condition. Such arrangements are normal parts of a pump-motor drive unit of which the unit 35 is typical.

Turning next to the combining planetary 36, the planetary includes a sun gear 70 which rotates as part of the motor shaft 38, a ring gear 71 journaled by bearings 72 on the drive unit housing 45, and a plurality of planetary gears 74, of which only one is shown, journaled on a carrier 75. The ring gear 71 carries outwardly extending teeth 71' which mesh with a pinion 73 on the PTO shaft 25. The carrier 75 is rotatably mounted coaxially of the motor shaft 38 and extends to a point adjacent the transmission output shaft 17. In the FIGS. 1 and 2 embodiment, the carrier 75 is coupled to the output shaft 17 through a selectively operable reversing planetary 76 having the purpose and construction described in detail below. However, when the transmission 11 is utilized in a standard, medium powered tractor, a direct coupling between the carrier 75 and the output shaft 17 can be employed so that these parts rotate as one. To facilitate a description of the operation of the drive unit 35 and the combining planetary 36, it will be assumed that such a direct coupling has been substituted for the reversing planetary 76 so that the carrier 75 directly drives the tractor differential gearing 18.

With the tractor engine operated at its governed speed, the pump shaft 37 is steadily driven in one direction through its direct coupling to the engine shaft 15 and the flywheel 16. The PTO shaft 25 is steadily rotated in the opposite direction through the pinion 28 and the gear 27. The constantly rotated PTO shaft 25 drives the ring gear 71 of the combining planetary 36 through the pinion 73 and the gear teeth 71'. It can thus be seen that the pump shaft 37 and the ring gear 71 rotate steadily in the same direction so long as a tractor engine is operated.

When the drive unit 35 is brought into operation by permitting a hydraulic pressure build-up between the pump pistons 40 and the motor pistons 43, the motor shaft 38 and thus the sun gear 70 of the combining planetary are rotated. Tilting the wobble plate 41 to its extreme fast forward position causes the motor shaft 38 to be driven in the same direction, and at about the same speed, as the pump shaft 37. As a result, the combining planetary carrier 75 is driven in the same direction as the ring gear 71 and the sun gear 70 are rotated. Since we are assuming that the carrier 75 is directly coupled to the output shaft 17, the tractor 10 is then driven forward at its top speed.

The driving speed of the tractor is selected by the setting of the wobble plate 41. As the wobble plate is moved from its extreme tilted position toward a position at right angles to the axis of the pump shaft 37, the motor shaft 38 and thus the sun gear 70 are driven at slower and slower speeds. As a result, the rotational speed of the carrier 75, and the driving speed of the tractor, is reduced. When the wobble plate 41 reaches at right angle position with respect to the axis of the pump shaft 37, the drive unit 35 becomes locked up so that the sun gear 70 is not rotated. However, the ring gear 71 continues to be powered from the PTO shaft 25 so that the planetary carrier 75 continues to be driven in a forward direction about the stationary sun gear 70.

As a feature of the invention, the gear ratios of the combining planetary 36 are preferably selected so that the carrier 75, and thus the output shaft 17, when driven solely by the ring gear 71 propels the tractor 10 at its normal working ground speed, which is usually in the neighborhood of about 6 m.p.h. When so arranged, the tractor, working normally and under load at its usual ground speed, is driven solely through the PTO shaft 25 and the drive unit 35 remains locked up. Thus, there is no loss of efficiency through the pump unit 35 and all of the engine power is transmitted through positive mechanical couplings.

To drive the tractor in reverse, the wobble plate 41 is tilted through a 90° angle with respect to the pump shaft 37 so that the motor shaft 38 is rotated in a reverse direction. This causes the sun gear 70 to rotate in a direction that is opposite to the ring gear 71 and, as the reverse rotation of the sun gear 70 is increased upon further tilting movement of the wobble plate 41, the carrier 75 comes to a stop and then begins reverse rotation.

When the transmission 11 is used in an otherwise standard tractor, and again assuming a direct coupling between the carrier 75 and the output shaft 17, a speed range of from +16 m.p.h. to −4 m.p.h. is conveniently obtained. As mentioned above, it is highly desirable to have the tractor reach its normal forward operating speed of about 6 m.p.h. when the drive unit 35 is set in its locked up condition. The speed of the tractor within the full range is, of course, infinitely variable upon proper setting of the wobble plate 41, through the servo 51, in response to manipulation of the lever 55.

When a tractor is intended for industrial use, those skilled in the art will appreciate that a full range of reverse speeds is highly desirable and to adapt the transmission 11 for this purpose is the function of the reversing planetary 76 mentioned above. The reversing planetary 76 includes an input element in the form of a sun gear 77 formed, in the illustrated embodiment, as an integral portion of the combining planetary carrier 75. The output element of the reversing planetary 76 is a carrier 78 that is keyed at 79 to the transmission output shaft 17. The carrier 78 supports a plurality of planet gears 80 arranged in pairs between the sun gear 77 and a ring gear 81 journaled by bearings 82 in a housing bracket 83.

To establish a direct forward drive between the combining planetary carrier 75 and the transmission output shaft 17, an annular, fluid actuated, disk clutch 84 is activated to directly couple the sun gear 77, and thus the carrier 75, to the ring gear 81. This locks the sun gear 77 and the ring gear 81 for simultaneous rotation and, of course, causes corresponding rotation of the output shaft 17 in the same direction and at the same rate as the combining planetary carrier 75.

To produce reverse rotation, the reversing planetary 76 includes a hydraulically actuated band clutch 85 which is clamped about the ring gear 81 to lock the ring gear relative to the housing bracket 83. At this time, of course, the disk clutch 84 is released. The sun gear 77 then drives the double planetary gears 80 against the stationary ring gear with the result that the carrier 78 is rotated in a direction opposite to the direction of rotation of the sun gear 77. In this way, rotation of the output shaft 17 is reversed relative to the combining planetary carrier 75 and thus a range of reverse speeds substantially as great as the range of forward speeds obtainable through the transmission 11 is achieved.

Figure 3:
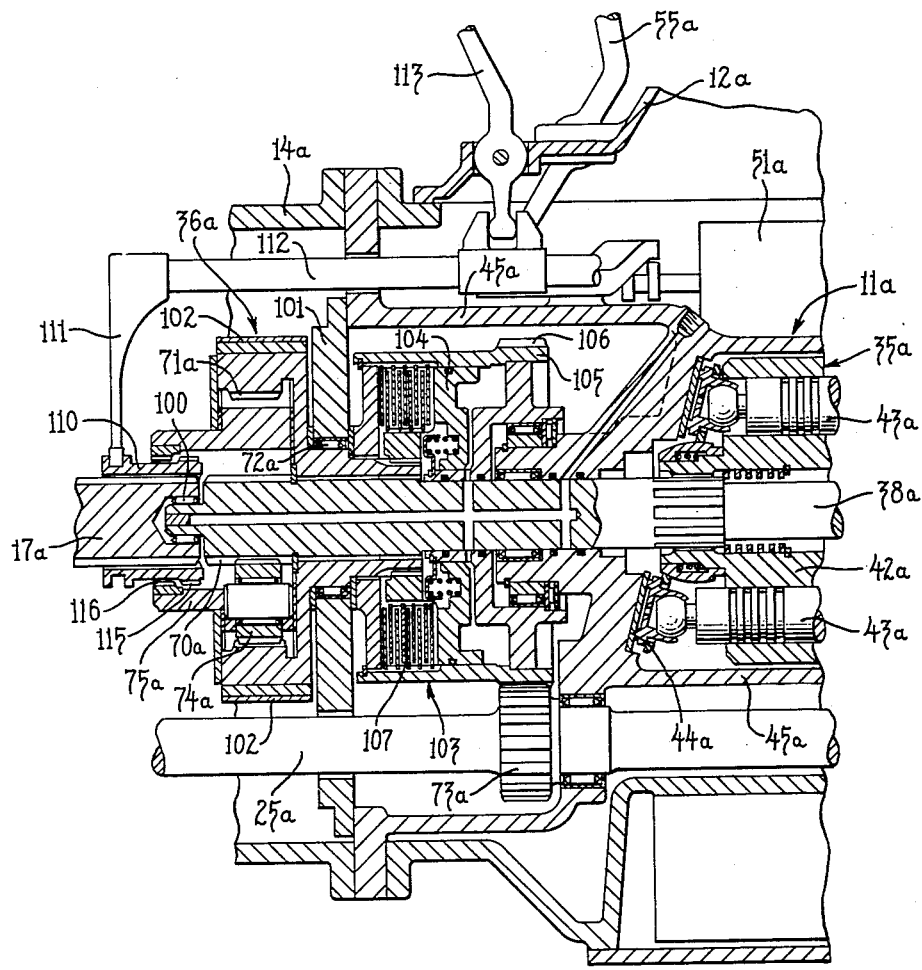
FIG. 3 is a fragmentary section similar to FIG. 2, showing a modified form of transmission also embodying the invention.

To adapt the transmission of the invention for use in high horsepower tractors where greater speed ranges can be efficiently utilized, the modification shown in FIG. 3 is particularly effective. In describing this modification of the invention, parts corresponding to those previously described have been given the same reference numeral with the distinguishing suffix "a" added. Thus, the transmission 11a is enclosed in a housing 12a fitted adjacent to a rear or differential housing 14a. A combining planetary 36a is driven from both a PTO shaft 25a and a pump-motor drive unit 35a so as to power a transmission output shaft 17a. The drive unit 35a includes a housing 45a mounting a motor bearing plate 44a against which a plurality of motor pistons 43a react to rotate a motor housing 42a and thereby drive a motor shaft 38a.

Figure 2:
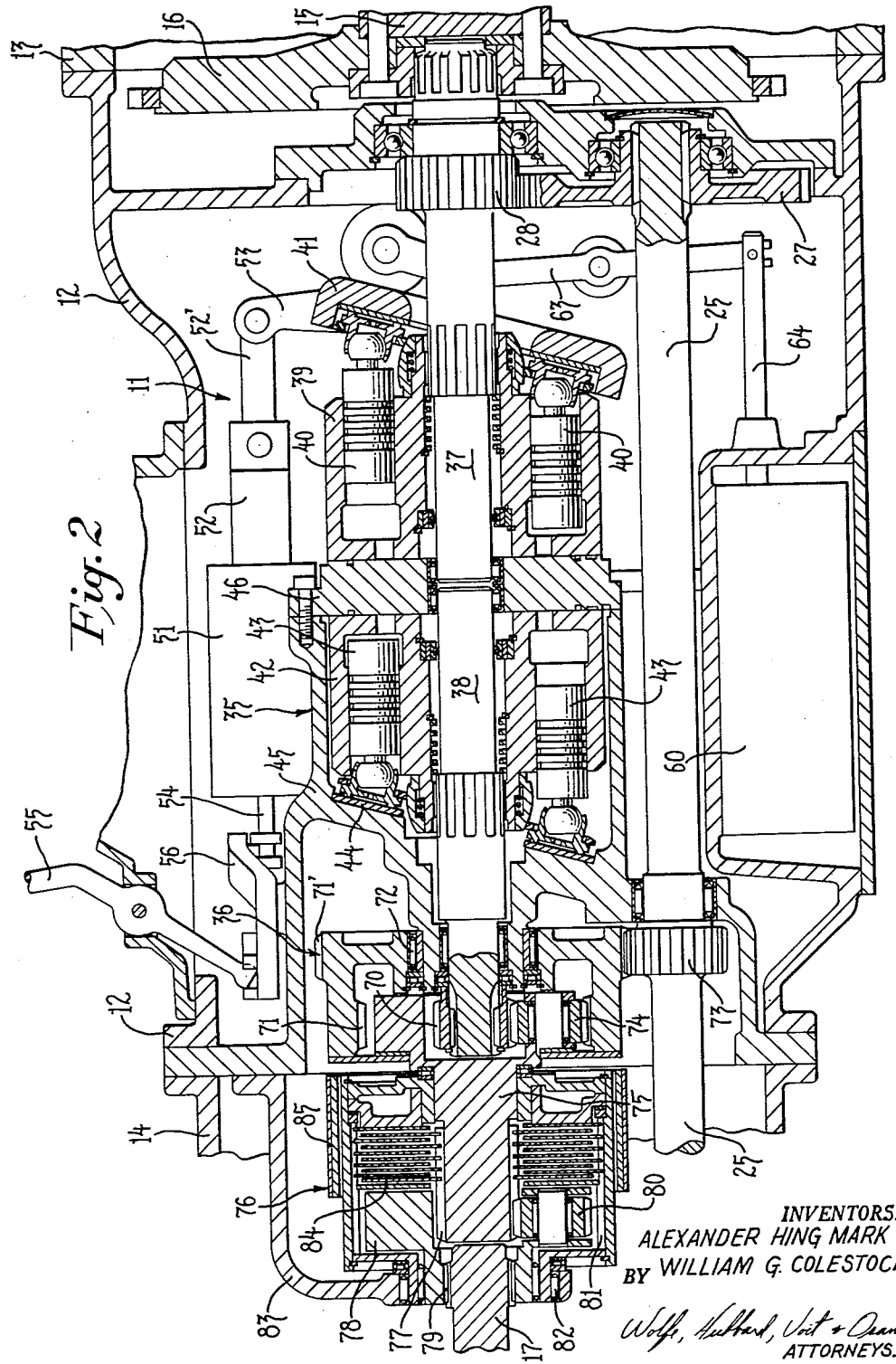
FIG. 2 is an enlarged longitudinal section of the transmission shown in FIG 1.

In this embodiment, the combining planetary 36a is mounted behind the drive unit housing 45a in approximately the position occupied by the reversing planetary 76 in the FIGS. 1 and 2 embodiment. The motor shaft 38a extends through the combining planetary 36a and is piloted at 100 into the end of the transmission output shaft 17a so that the shafts 38a and 17a are held in axial alinement. A sun gear 70a is formed as an integral portion of the motor shaft 38a and is in meshing engagement with a plurality of planet gears 74a which are journalled on a carrier 75a. A ring gear 71a surrounds the planet gears 74a and is journalled by bearings 72a in a wall 101 secured to the drive unit housing 45a.

In accordance with this feature of the invention, the ring gear 71a may be either locked against rotation by a selectively operable band clutch 102 or coupled to the PTO shaft 25a through an annular fluid disk clutch 103. The band clutch 102 is controlled by a hydraulic actuator (not shown) so as to lock the ring gear 71a relative to the housing wall 101. The disk clutch 103 includes a piston 104 which is actually shiftable within a clutch housing 105. The housing 105 carries peripherally disposed gear teeth 106 which are in meshing engagement with a pinion portion 73a formed on the PTO shaft 25a. As will be apparent to those familiar with the art, when fluid under pressure is admitted to the right of the piston 104 as seen in FIG. 3, the piston is moved to the left so as to clamp a plurality of interfitted disks 107 together, thereby locking the clutch housing 105 to the ring gear 71a. This establishes a direct drive from the PTO shaft 25a to the ring gear 71a.

It will thus be apparent that when the fluid clutch 103 is engaged and the band clutch 102 released, the combining planetary 36a combines the outputs of the motor shaft 38a and the PTO shaft 25a to drive the carrier 75a in a manner identical to that described in connection with the transmission embodiment shown in FIGS. 1 and 2. Alternatively, releasing the fluid clutch 103 and engaging the band clutch 102 so as to lock the ring gear 71a against rotation, causes the combining planetary 36a to function as a conventional planetary gearing arrangement wherein power from the motor shaft 38a, as exerted by the sun gear 70a, drives the planet gears 74a and their planet carrier 75a within the then stationary ring gear 71a.

As a further feature of this modification of the invention, the output shaft 17a carries a splined jaw-clutch element 110 which is axially shiftable on, and which rotates with, the shaft 17a. The position of the jaw element 110 is controlled by a shifter fork 111 which is mounted on a rod 112 whose position is controlled by a lever 113. Swinging the lever 113 counterclockwise shifts the rod 112 to the right in FIG. 3, so that the shifter fork 111 carries the jaw element 110 into clutching engagement with the sun gear 70a. This establishes a direct drive between the motor shaft 38a and the transmission output shaft 17a. Returning the lever 113 in a clockwise direction to the position of the parts illustrated in FIG. 3 clears the jaw element 110 from the sun gear 70a and a neutral position is established in which the transmission output shaft 17a is not driven. Further movement of the control lever 113 in a clockwise direction carries the jaw element 110 to the left in FIG. 3 so that a set of teeth 115 on the jaw element come into engagement with a set of teeth 116 formed on the combining planetary carrier 75a. This establishes a direct drive between the combining planetary carrier 75a and the transmission output shaft 17a.

The operation of the transmission shown in the embodiment of FIG. 3 can now be appreciated. An intermediate speed range is achieved by applying the disk clutch 103, releasing the band clutch 102, and shifting the jaw element 110 to the left so that a direct drive is established between the planetary carrier 75a and the transmission output shaft 17a. With this setting of the parts, the ring gear 71a and the sun gear 70a will combine to drive the carrier 75a, and thus the output shaft 17a, in the same manner as was described in connection with the FIGS. 1 and 2 embodiment.

To establish a high speed range, the jaw element 110 is shifted to the right so as to directly couple the motor shaft 38a to the transmission output shaft 17a and thus the tractor drive is powered entirely through the pump-motor drive unit 35a.

To establish a low speed range, the jaw element 110 is again shifted to the left so as to couple the planetary carrier 75a to the output shaft 17a. The disk clutch 103 is released and the band clutch 102 applied so that the ring gear 71a is locked. With this arrangement of the parts, the tractor is again powered solely through the drive unit 35a as in the intermediate speed range described above but, because of the conventional planetary action of the planetary 36a with its then locked ring gear 71a, an effective speed reduction is achieved which results in a very low speed range for the transmission.

It will be appreciated that in each of the "high," "intermediate," and "low" speed ranges referred to above, control of the drive unit 35a through a servo 51a and a lever 55a results in infinitely variable speed settings from the top to the bottom of each range. Moreover, reverse rotation of the motor shaft 38a, by suitably setting the drive unit 35a in the manner described above in connection with the drive unit 35, permits slow reverse drive in each of the three speed ranges provided by the transmission 11a.

It can now be seen that the transmission arrangements 11 and 11a provide infinitely variable speed control for a tractor without requiring extensive and expensive modification of the basic tractor driving train. The relative positions of the engine shaft, PTO shaft, and transmission output shaft including the differential gearing, remain the same as in a conventional shiftable gear transmission. The axial disposition of the pump-motor drive units 35 and 35a with respect to the combining planetaries 36 and 36a permit these parts to be comfortably fitted in a transmission housing of conventional size and shape. However, as has been pointed out, complete versatility is achieved, with the transmission design being readily adapted for use with conventional tractors, industrial tractors which must have the same agility in reverse as in forward drive, and in high powered tractors which readily utilize a wide range of speeds.

Also of particular importance is the arrangement which permits the tractor to be driven at its normal forward operating speed with all power being supplied through the PTO shaft so that the transmission functions at optimum efficiency during the majority of its use.

We claim as our invention:

1. In a tractor transmission driven by a rotating power shaft, the combination comprising, a housing, an infinitely variable pump-motor drive unit mounted in said housing and having oppositely extending, axially alined pump and motor shafts, said pump-shaft being alined with and coupled to said power shaft, a PTO shaft spaced laterally of said drive unit and being journalled in said housing parallel to said pump and motor shafts, said motor shaft and said PTO shaft being geared together for opposite rotation, a combining planetary including a sun gear, ring gear and connecting planet gears journalled on a carrier, said sun gear rotating as part of said motor shaft, said ring gear being geared to and driven by said PTO shaft, and a transmission output shaft coupled to and driven by said carrier.

2. In a tractor transmission driven by a rotating power shaft, the combination comprising, a housing, an infinitely variable pump-motor drive unit mounted in said housing and having axially alined pump and motor shafts, means for selectively adjusting said drive unit so that said motor shaft is driven by said pump shaft through a range from slow reverse to fast forward rotation including a locked up condition wherein the motor shaft is not rotated, said pump-shaft being alined with and coupled to said power shaft, a PTO shaft journalled in said housing parallel to said pump and motor shafts, said motor shaft and said PTO shaft being geared together for opposite rotation, a combining planetary including a sun gear, ring gear and connecting planet gears journalled on a carrier, said sun gear rotating as part of said motor shaft, said ring gear being geared to and driven by said PTO shaft, and a transmission output shaft coupled to and driven by said carrier, said planetary gear ratios being selected so that said output shaft is driven at a slow forward speed when said pump-motor is locked-up.

3. In a tractor transmission driven by a rotating power shaft, the combination, comprising, a housing, an infinitely variable pump-motor drive unit mounted in said housing and having oppositely extending axially alined pump and motor shafts, said pump-shaft being alined with and coupled to said power shaft, a PTO shaft spaced laterally of said drive unit and being journalled in said housing parallel to said pump and motor shafts, said motor shaft and said PTO shaft being geared together for opposite rotation, a combining planetary including a sun gear, ring gear and connecting planet gears journalled on a carrier, said sun gear rotating as part of said motor shaft, said ring gear being geared to and driven by said PTO shaft, and a reversing planetary mounted on and driven by said carrier, a transmission output shaft mounted in said housing in alinement with said carrier, and means for selectively conditioning said reversing planetary so that said carrier rotates an output shaft in either forward or reverse directions.

4. In a tractor transmission driven by a rotating power shaft, the combination comprising, a housing, a pump-motor drive unit mounted in said housing and having pump and motor shafts, said pump shaft being coupled to said power shaft, a PTO shaft journalled in said housing, said motor shaft and said PTO shaft being geared together, a combining planetary including a sun gear, ring gear and connecting planet gears journalled on a carrier, said sun gear rotating as part of said motor shaft, means for selectively coupling said ring gear for rotation with said PTO shaft, means for selectively locking said ring gear with respect to said housing, a transmission output shaft, and a shiftable coupling element for selectively coupling said output shaft directly to said motor shaft or to said carrier.

5. In a tractor transmission driven by a rotating power shaft, the combination comprising a housing, an infinitely variable pump-motor drive unit mounted in said housing and having axially alined pump and motor shafts, said pump shaft being alined with and coupled to said power shaft, a PTO shaft journalled in said housing parallel to said pump and motor shafts, said motor shaft and said PTO shaft being geared together for opposite rotation, a combining planetary including a sun gear, ring gear and connecting planet gears journalled on a carrier, said sun gear rotating as part of said motor shaft, selectively operable means for coupling said ring gear for rotation with said PTO shaft, selectively operable means for locking said ring gear with respect to said housing, a transmission output shaft adjacent to and alined with said motor shaft, and a shiftable coupling element for selectively coupling said output shaft directly to said motor shaft or to said carrier.

6. In a tractor transmission driven by a rotating power shaft, the combination comprising a housing, an infinitely variable pump-motor drive unit mounted in said housing and having axially alined pump and motor shafts, said pump shaft being alined with and coupled to said power shaft, a PTO shaft journalled in said housing parallel to said pump and motor shafts, said motor shaft and said PTO shaft being geared together for opposite rotation, a combining planetary including a sun gear, ring gear and connecting planet gears journalled on a carrier, said sun gear rotating as part of said motor shaft, an annular fluid clutch for coupling said ring gear for rotation with said PTO shaft, a selectively operable brake for locking said ring gear with respect to said housing, a transmission output shaft adjacent to and alined with said motor shaft, and a shiftable coupling element for selectively coupling said output shaft directly to said motor shaft or to said carrier, said element also having a neutral position in which said output shaft is not driven.

7. In a tractor having an engine driven power shaft and two parallel output shafts for traction drive and PTO drive respectively, a transmission comprising, in combination, a continuously variable and reversible drive unit having oppositely extending input and output members, a differential gear assembly positioned adjacent said unit and having three interacting power transmitting elements coupled together for differential rotation, a PTO shaft journalled in alinement with and being coupled to said output shaft for PTO drive, means coupling said input member and said PTO shaft for rotation with said power shaft, and means rotatably coupling one of said elements to said output member, another of said elements to said PTO shaft and the third of said elements to said output shaft for traction drive whereby the PTO shaft provides a power path paralleling said drive unit for both driving the output shaft for PTO drive and assisting the drive to the output shaft for traction drive.

8. A drive system for a vehicle comprising, in combination, a driven power input shaft, an output shaft, a continuously variable and reversible drive unit having input and output members with the input member being drivingly coupled to said power input shaft, a power transmitting shaft drivingly coupled to said power input shaft, a differential gear assembly connecting said drive unit and said power transmitting shaft to said output shaft so as to provide a first drive path from said input shaft to said output shaft, means for selectively disconnecting said gear assembly from said output shaft and drivingly coupling said output shaft to said output member so as to provide a second drive path from said input shaft to said output shaft, whereby operation of said means selects either of two drive paths both providing continuous variability but with different speed and torque limits.

9. A drive system for a vehicle comprising, in combination, a driven power input shaft, an output shaft, a continuously variable and reversible drive unit having input and output members with the input member being drivingly coupled to said power input shaft, a power transmitting shaft drivingly coupled to said power input shaft, a differential gear assembly connecting said drive unit and said power transmitting shaft to said output shaft so as to provide a first drive path from said input shaft to said output shaft, means for selectively disconnecting said gear assembly from said output shaft and drivingly coupling said output shaft to said output member so as to provide a second drive path from said input shaft to said output shaft, and means for selectively disconnecting said power transmitting shaft from said gear assembly and conditioning said gear assembly to drivingly connect said output member to said output shaft so as to provide a third drive path from said input shaft to said output shaft, whereby operation of said two means selects either of three drive paths all providing continuous variability but with different speed and torque limits.

References Cited in the file of this patent

UNITED STATES PATENTS

| | | |
|---|---|---|
| 2,599,814 | Cull | June 10, 1952 |
| 2,901,921 | Woydt | Sept. 1, 1959 |
| 2,901,922 | Baker | Sept. 1, 1959 |
| 2,929,269 | Woydt | Mar. 22, 1960 |